United States Patent
McBarron et al.

(10) Patent No.: US 7,853,703 B1
(45) Date of Patent: Dec. 14, 2010

(54) METHODS AND APPARATUSES FOR IDENTIFICATION OF DEVICE PRESENCE

(75) Inventors: Brian P. McBarron, Export, PA (US); Michael Bryan Herf, Studio City, CA (US)

(73) Assignee: Google, Inc., Mountain View, CA (US)

( * ) Notice: Subject to any disclaimer, the term of this patent is extended or adjusted under 35 U.S.C. 154(b) by 1055 days.

(21) Appl. No.: 11/089,915

(22) Filed: Mar. 24, 2005

(51) Int. Cl.
G06F 15/177 (2006.01)
G06F 15/16 (2006.01)
H04M 1/663 (2006.01)

(52) U.S. Cl. .................. 709/228; 709/221; 455/412.1
(58) Field of Classification Search ............... 709/206, 709/228; 455/412.1
See application file for complete search history.

(56) References Cited

U.S. PATENT DOCUMENTS

| | | | |
|---|---|---|---|
| 6,587,874 B1* | 7/2003 | Golla et al. ................ 709/220 |
| 6,782,474 B1* | 8/2004 | Ylonen ..................... 713/162 |
| 6,836,806 B1* | 12/2004 | Raciborski et al. .......... 709/245 |
| 6,959,339 B1* | 10/2005 | Wu et al. .................. 709/246 |
| 7,082,200 B2* | 7/2006 | Aboba et al. ............... 380/273 |
| 7,093,000 B1* | 8/2006 | Yamagishi et al. .......... 709/219 |
| 7,120,455 B1* | 10/2006 | Chen et al. ................ 455/466 |
| 7,171,190 B2* | 1/2007 | Ye et al. .................. 455/412.1 |
| 7,260,638 B2* | 8/2007 | Crosbie .................... 709/229 |
| 2002/0035699 A1* | 3/2002 | Crosbie .................... 713/201 |
| 2002/0116637 A1* | 8/2002 | Deitsch et al. ............. 713/201 |
| 2004/0039801 A9* | 2/2004 | Srinivasan et al. .......... 709/221 |
| 2004/0122901 A1* | 6/2004 | Sylvain .................... 709/206 |
| 2004/0215723 A1* | 10/2004 | Chadha .................... 709/206 |
| 2006/0123081 A1* | 6/2006 | Baudino et al. ............ 709/204 |
| 2006/0129638 A1* | 6/2006 | Deakin ..................... 709/203 |
| 2006/0184681 A1* | 8/2006 | Bernardi et al. ............ 709/229 |

* cited by examiner

*Primary Examiner*—George C Neurauter, Jr.
*Assistant Examiner*—Anish Sikri
(74) *Attorney, Agent, or Firm*—Blakely Sokoloff Taylor & Zafman LLP (57) ABSTRACT

In one embodiment, device presence enables persistent access to a set of resources, which may be data or services. Unique device identifiers are assigned to different computers of a user to identify the computers of the user of a network. For example, a device identifier is specific for a user and specific for a messaging system. Some time-consuming and device-specific tasks, such as synchronization of photo albums, transmitting files, sharing a printer, etc., may be interrupted temporarily, such as when the computer is restarted. Using the device identifiers, the messaging system can uniquely identify the devices involved in the tasks and detect the presence of the devices so that, after the interruption, the tasks can be resumed without user intervention.

20 Claims, 11 Drawing Sheets

METHODS AND APPARATUSES FOR IDENTIFICATION OF DEVICE PRESENCE

FIELD OF THE TECHNOLOGY

At least some embodiments of the present invention relate to networks in general, such as instant messaging systems, and more particularly to establishing communication connections through a network.

BACKGROUND

The Internet provides a versatile communication channel for various machines, or communication devices, to communicate with each other. Many applications have been developed to use the Internet to meet various communication needs.

For example, electronic mails (emails) are electronic files that can be transferred from one computer to another over the Internet. For reliable transmission, emails may be queued at various stages of the transmission from the originating computer to the destination. For example, an outgoing email may be queued in a mail server until a communication connection can be made to transfer the email. Typically, incoming emails are queued in the inbox of the computer, waiting for the user to view.

Instant messaging (IM) provides convenient two-way real-time communication between people using a variety of different device types, such as a personal computer (PC), a personal digital assistant (PDA), a digital cellular phone, etc. Instant messaging can incorporate image, voice and/or video. Instant messages are transmitted in a real time fashion over a communication connection between two devices for an instant messaging session. When the communication connection breaks, the instant messaging session ends. For example, when one of the devices used in the instant messaging session shuts down (or restarts, goes offline, etc.), the instant messaging session ends.

Currently, there are a number of instant messaging systems available, such as Google's Hello, American Online Instant Messenger (AIM), Microsoft Network (MSN) messenger, Java Instant Messaging, Jabber, ICQ, etc.

Most messaging systems allow users to connect to each other according to user identities. A user can have a contact list of user identities as friends or a buddy list. The messaging system provides services for the users to connect to each other according to the user identities.

Many messaging systems provide services for user presence information. In a traditional messaging system, presence awareness lets users know whether other users, particularly those on their contact lists, are on-line and willing to accept messages.

SUMMARY OF THE DESCRIPTION

In one aspect of the present invention, a method includes assigning one or more device identifiers to a communication device of a network, where each device identifier corresponds to one user in the network.

DETAILED DESCRIPTION

In one embodiment of the present invention, device presence enables persistent access to a set of resources, which may be data or services. Unique device identifiers (ids) are assigned to different computers of a user to identify the computers of the user in the real time messaging system. In one embodiment, the device ids are independent from network parameters, such as host name, IP address, etc., such that even if such parameters are changed (when the network connections are changed), the machine can still be uniquely and correctly identified within the messaging system. In one embodiment, a device id is specific for a user and specific for the messaging system. Some time-consuming and device-specific tasks, such as synchronization of photo albums, transmitting files, sharing a printer, etc., may be interrupted temporarily, such as when the computer is restarted. Using the device ids, the messaging system can uniquely identify the devices involved in the tasks and detect the presence of the devices so that, after the interruption, the tasks can be resumed without user intervention.

Process

Figure 1:
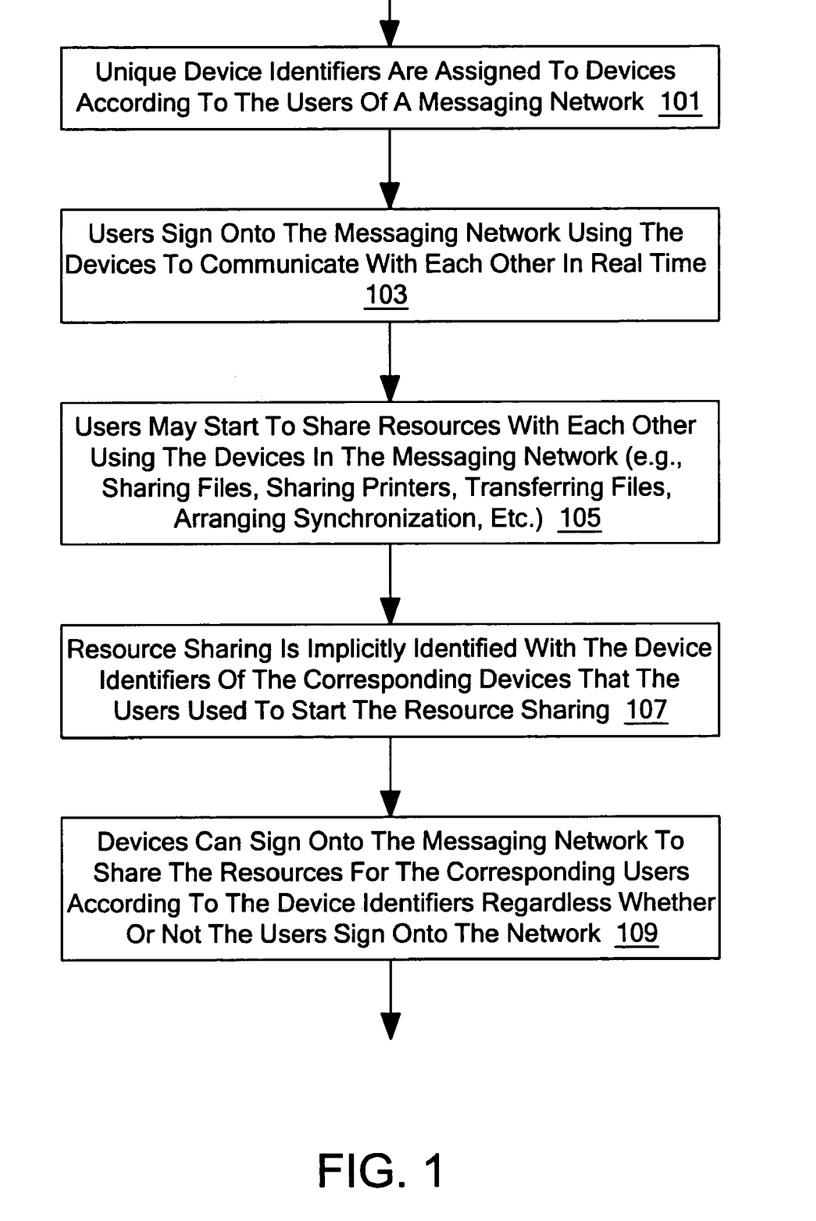
FIG. 1 illustrates a method for messaging according to one embodiment of the present invention.

One embodiment of the present invention provides identification of device presence as described in the flow diagram of FIG. 1.

In one embodiment of the present invention, unique device identifiers are assigned (101) to devices according to the users of a messaging network. After users sign (103) onto the messaging network using the devices to communicate with each other in real time, users may start (105) to share resources with each other using the devices in the messaging network (e.g., sharing files, sharing printers, transferring files, arranging synchronization, etc.).

In one embodiment, resource sharing is implicitly identified (107) with the device identifiers of the corresponding devices that the users used to start the resource sharing. Thus, devices can sign (109) onto the messaging network to share the resources for the corresponding users according to the device identifiers regardless whether or not the users sign onto the network.

Environment/System

Embodiments of the present invention are applicable to real time communication systems, such as Hello, AIM, ICQ, MSN messenger, Java Instant Messaging, Jabber, etc., and other communication systems that may not be real time.

Figure 2:
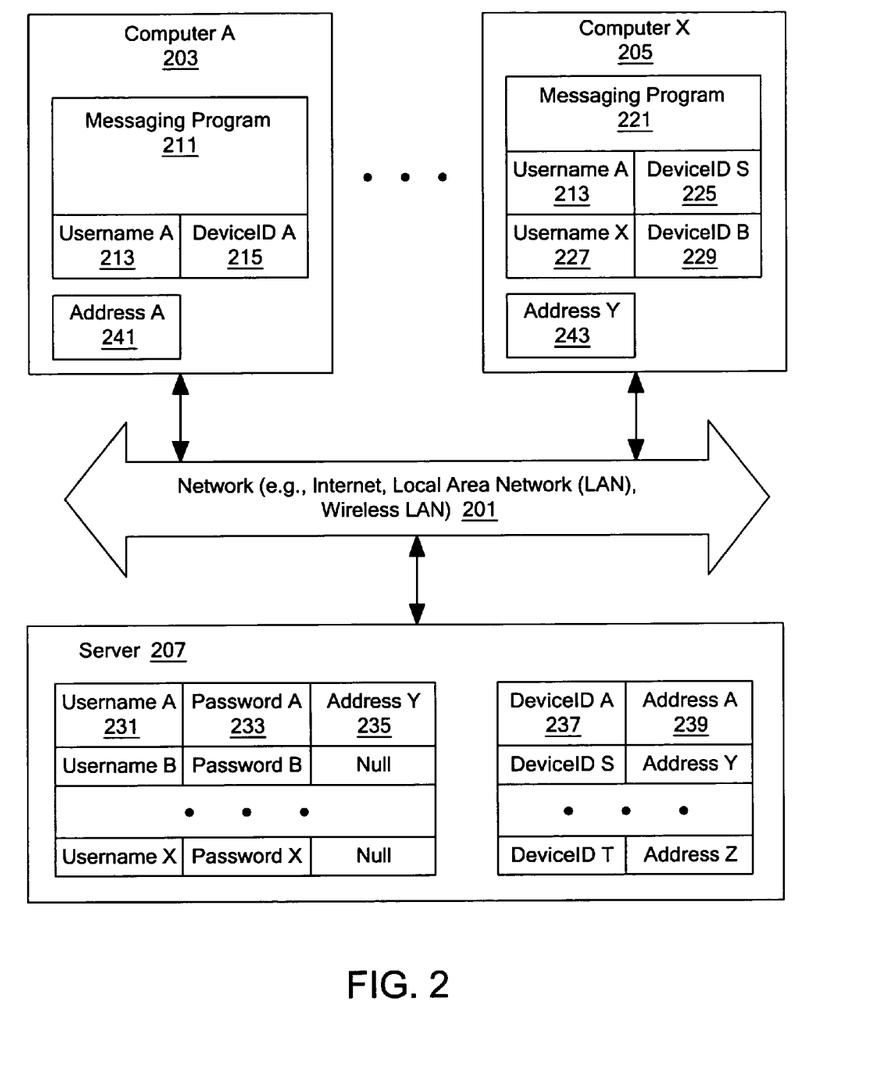
FIG. 2 illustrates a messaging environment according to one embodiment of the present invention.

FIG. 2 illustrates a messaging environment according to one embodiment of the present invention.

In one embodiment, a server (207) provides service to communication devices, such as computer A (203), computer X (205), etc., such that the users can connect to each other according to usernames regardless of the particular devices they use.

For example, a user may use computer A (203) to send and receive messages. Computer A (203) has a messaging program (211) installed. A username (213) represents the user in the network for messages.

The user may also use computer X (205) to send and receive messages. Computer X (205) also has a messaging program (221) installed. The username (213) in the messaging program (221) in computer X (205) also represents the same user in the messaging network.

In one embodiment, the messaging programs (211) are instant messaging programs for sending and receiving instant messages in an instant messaging network, where the users are represented by their usernames.

Different users may use the same computer to send and receive messages. For example, another user represented by username X (227) can use the computer X (205) for instant messaging. Different users can use the same computer at different times.

Different devices used by a same user for messaging typically have different network addresses. For example, computer A (203) has address A (241) used for network communication over the network (201), such as Internet, Local Area Network (LAN), wireless LAN, etc. Computer X (205) has address Y (243), which is typically different from address X (241).

Further, a same computer may use different address at different times. For example, the computer may obtain a dynamic IP (Internet Protocol) address for Internet access. When the computer uses a wireless access point to access Internet, the computer is dynamically assigned an IP address. When the computer uses different wireless access points to access Internet, the computer can be in different network domains. If the computer uses different network interface cards, such as removable network cards, the MAC (Media Access Control) address can also be different.

The server (207) provides user presence information to help users to connect to each other regardless the devices they use. When the user signs on to the network from a computer, the computer communicates with the server (207) that has a known address. The server can then communicates the presence information of the user at a particular address to other users. Once the messaging program of a user obtains the presence information about another user, a communication connection can be made for the users to start a messaging session.

For example, when username A (213) signs on from computer X (205) that is at address Y (243), the server (207) stores the address Y (235) in association with username A (231) in a database to indicate that the user of username A is available online at address Y (235). Using this information from the server (207), other users can connect to the user for instant messaging. Typically, a password (e.g., 233) is required to authenticate the user and sign the user onto the instant messaging network.

The user presence awareness provides a convenient way for users to connect to each other. The user presence shields device aspects from the users. Thus, the users don't have to be aware of the identity of the devices used in the communication, the network parameters, etc.

In one embodiment of the present invention, instant messaging is further expanded to include communications that are not only user dependent but also device dependent. For example, during an instant messaging session, the users may start to share an image. Transferring an image of a significant data size from one computer to another through the network can take such a long period of time that the user may not want to maintain user presence for the entire period.

In one embodiment of the present invention, the user may sign off while maintaining device presence on the network so that the transferring of the image can be performed while the user is not online.

Further, the transferring of the image may be interrupted for some reasons. For example, the dynamically leased IP address of a computer may be changed during the period of transferring the image; the computer may be moved to another location; the computer may be moved to a different wireless access point; the computer may be restarted after a system crash; etc. The device presence according to one embodiment of the present invention allows the transfer to resume after interruption.

Other examples of device dependent tasks include: arranging synchronization of a set of files between two computers through an instant messaging session, sharing peripheral resources (e.g., printers) between two computers, scheduling communication tasks (e.g., transferring image files or video files) for a later time, etc. In one embodiment of the present invention, device presence awareness allows the devices to perform device dependent tasks even when the users are not present on the network. For example, file transferring, data synchronization, printing, scanning, importing images from a camera etc., can be implicitly scheduled with specific devices used in a session in association with a user id.

In one embodiment, unique device ids are assigned to different computers of a user to identify the computers of the user in the real time messaging system. For example, deviceID A (215) is assigned to computer A (203) for the username A (213); and deviceID S (225) is assigned to computer X (205) for the same username A (213). DeviceID B (229) is assigned to the same computer X (205) for username X (227). DeviceID S (225) and DeviceID B (229) are typically different.

DeviceID A (215) represents computer A (203) as used by username A (213). Different computers used by the same user have different device identifiers so that the particular device involved in the device dependent tasks can be identified using the corresponding device identifier.

In one embodiment of the present invention, the same computer used by different users have different device identifiers so that the privacy of the users is protected. Further, in one embodiment of the present invention, the device identifiers are used internally by the instant messaging programs without being displayed to the users to protect the privacy of the users.

Alternatively, different users of a same device may share a same device identifier.

In a further alternative embodiment, only one user of a computer is allowed to have a device identifier for device dependent tasks.

In one embodiment of the present invention, the device identifiers are independent from network parameters, such as host name, IP address, etc., such that even if such parameters are changed (when the network connections are changed), the device can still be uniquely and correctly identified within the messaging system. Specific examples of device identifiers for device presence are provided below. Alternatively, the information of the network parameters of the computer used at the time of generating the device identifier for the computer may be used in generating the device identifier for the computer. For example, the device identifier may include the MAC address the computer uses at the time the device identifier is generated; however, the device identifier persists even after the MAC address of the computer changes.

A device id is specific for a user and specific for the messaging device. A user typically has a unique user ID within a messaging system; and a unique device id includes the user ID as a part of the unique device id.

Some time-consuming and device-specific tasks, such as synchronization of photo albums, transmitting files, sharing a printer, etc., may be interrupted temporarily, such as when the computer is restarted. It may be inappropriate to resume the tasks on a different computer the user switches to.

Using the device ids, the messaging system can uniquely identify the devices involved in the tasks and detect the presence of the devices so that, after the interruption, the tasks can be resumed without user intervention. The detection of the presence of a specific device associated with a user can also be used in collaboration, replication, performing scheduled tasks, identifying available files, printers, etc.

In FIG. 2, the server (207) also provides service for device presence information. For example, when computer A (203) signs onto the instant messaging network, the server (207) keeps the presence information of the computer A (203) in a database. For example, the server (207) may store the deviceID A (237) with address A (239) to indicate that the computer represented by deviceID A (237) is available online at the particular address on the network.

Using the device presence information, devices can connect to each other for device-specific communication tasks after the interruption of the communication link that is used in initiating or scheduling the tasks.

Although many examples of the present invention are illustrated with messaging systems with central servers to provide service to establish communication connection, the centralized network servers may be absent in certain embodiments. Communication connections can be established through other ways. For example, the users may exchange network addresses through telephone calls, emails, web sites, domain name servers, etc. Further, device presence information may be exchanged using other types of networks, such as in a peer-to-peer file sharing network, in a way similar to that in an instant messaging system.

Example

Figure 3:
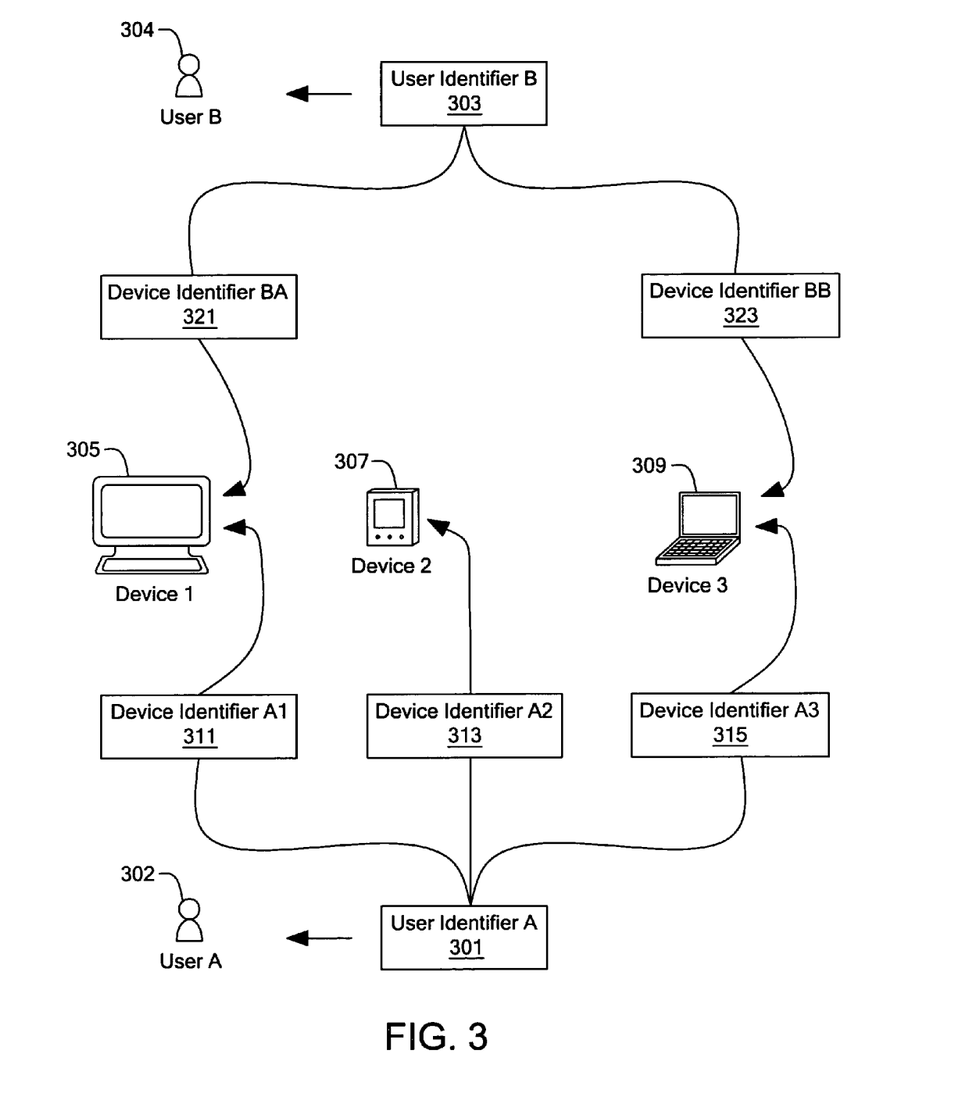
FIG. 3 illustrates a hierarchy of user identifiers and device identifiers according to one embodiment of the present invention.

FIG. 3 illustrates a hierarchy of user identifiers and device identifiers according to one embodiment of the present invention.

In one embodiment of the present invention, device identifiers are associated with the user identifiers.

For example, user identifier A (301) in FIG. 3 represents user A (302) in the messaging system. User A (302) may use device 1 (305), device 2 (307) or device 3 (309) for instant messaging. Thus, device identifier A1 (311), device identifier A2 (313), and device identifier A3 (315) are assigned to device 1 (305), device 2 (307) or device 3 (309) respectively for user identifier A (301).

For example, device identifier A1 (311) uniquely identifies a particular device used by user identifier A (301), which is representative of user A (302). From device identifier A1 (311), it can be determined that the device is used by user identifier A (301). Device identifier A1 (311) persistently represents device 1 (305) such that if a communication task is arranged with device identifier A1 (311), it is arranged with device 1 (305).

Device identifier A1 (311) is associated with only user identifier A (301) such that device identifier A1 (311) does not reveal information about other users.

For example, user identifier B (303) represents user B (304) in the instant messaging system. Device 1 (305) as used by user B (304) is assigned device identifier BA (321); and device 3 (309) as used by user B (304) is assigned device identifier BB (323). Thus, the same device used by different users is assigned different device identifiers. The device identifiers used to identify the devices in the instant messaging system will not reveal the inter-relations between users.

Alternatively, the same device used by different user identifiers may use a shared device identifier. In such an embodiment, the device identifier alone may not be sufficient to determine a user identifier.

Figure 4:
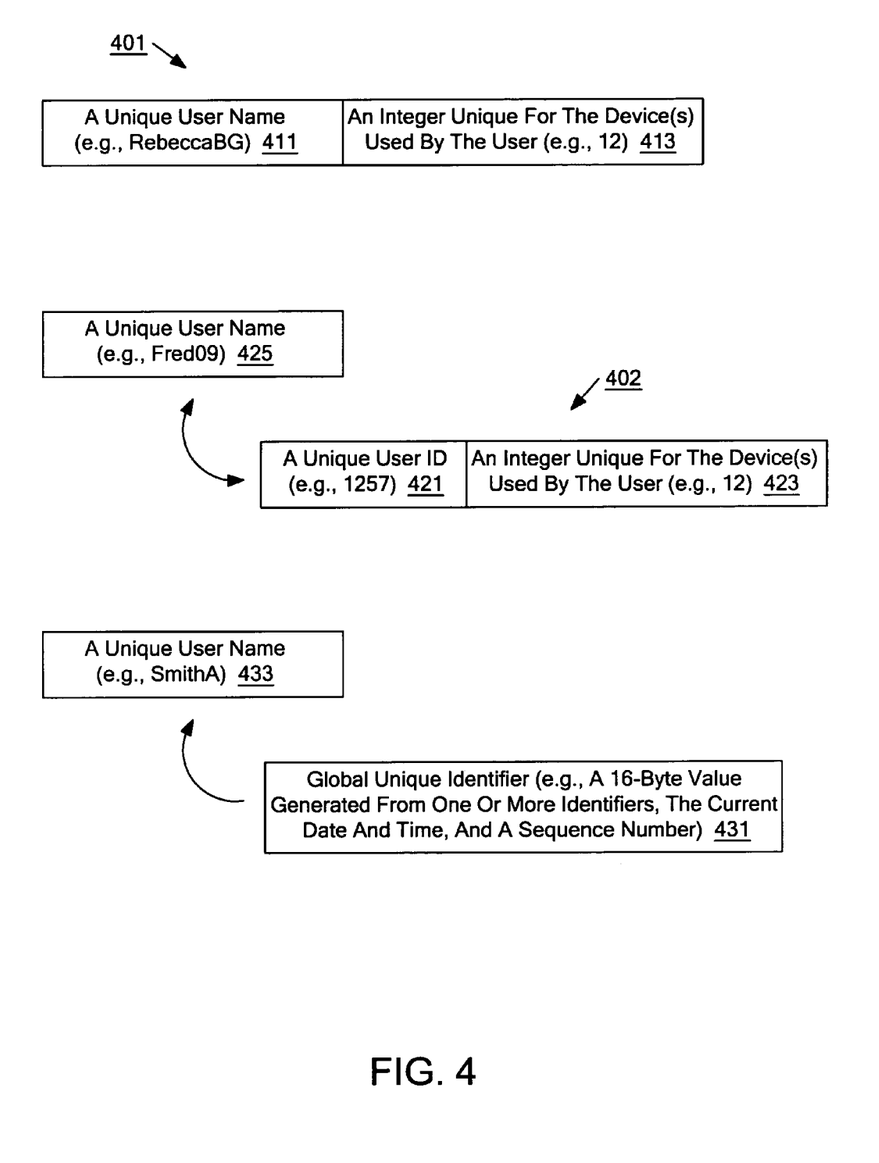
FIG. 4 illustrates examples of device identifiers according to one embodiment of the present invention.

FIG. 4 illustrates examples of device identifiers according to one embodiment of the present invention.

In one embodiment of the present invention, a device identifier (401) includes a unique user name (411) and an integer (413) unique for the device(s) used by the user. The user name, such as RebeccaBG, is unique for a user in the instant messaging system. Thus, the device identifier (401) uniquely identifies the user and the device.

In one embodiment, the integer (413) is represented by a sixteen-bit data item, which allows a user to use up to 65536 devices without duplicated device identifiers to different devices. Other types and sizes of data representations can also be used. For example, an eight-bit or thirty-two-bit data item can be combined with the user name to form the device identifier.

The data item may be appended to the end of the user name or inserted before the user name. Alternatively, the data (413) may not be a fixed size. For example, a special symbol such as "#", "|", ":" or a symbol that is not used in user identifiers can be used to separate the user name and a variable size data item that uniquely identifies the device(s) used by the user.

Alternatively, the user name may be replaced with a unique user id (421) that has a one-to-one mapping to a unique user name (425), such as in the device identifier (402). In one embodiment of the present invention, the device identifier is not presented to a user. Thus, the device identifier does not have to be in a user-friendly form. The unique user id can be a number data item that is large enough to represent the user population in the instant messaging network. The user id (421) can be mapped to the user name (425) using a database table.

In one embodiment of the present invention, the device identifiers are generated at a server to ensure the uniqueness of the device identifiers relative to users and devices. Alternatively, the device identifiers may also be generated as global unique identifiers by individual devices, a set of cooperative servers, or a set of independent servers.

In one embodiment of the present invention, a device identifier is a global unique identifier (431), such as a 16-byte value generated from one or more identifiers (e.g., the unique user name), the current date and time, and a sequence number. For example, universally unique identifiers standardized by Open Software Foundation for distributed computing environment can be used. Although global unique identifiers are independently generated in a distributed environment, the chance of two global unique identifiers colliding with each other is so small that it is reasonably believed to be zero. Thus, global unique identifier techniques can be used to generate the device identifiers in a distributed fashion with reasonable confidence that the generated device identifiers are globally unique.

The global unique identifier is generated for a particular device and a particular user identifier. In one embodiment of the present invention, the global unique identifier (431) is associated with the unique user name so that from the global unique identifier the unique user name can be determined.

Figure 5:
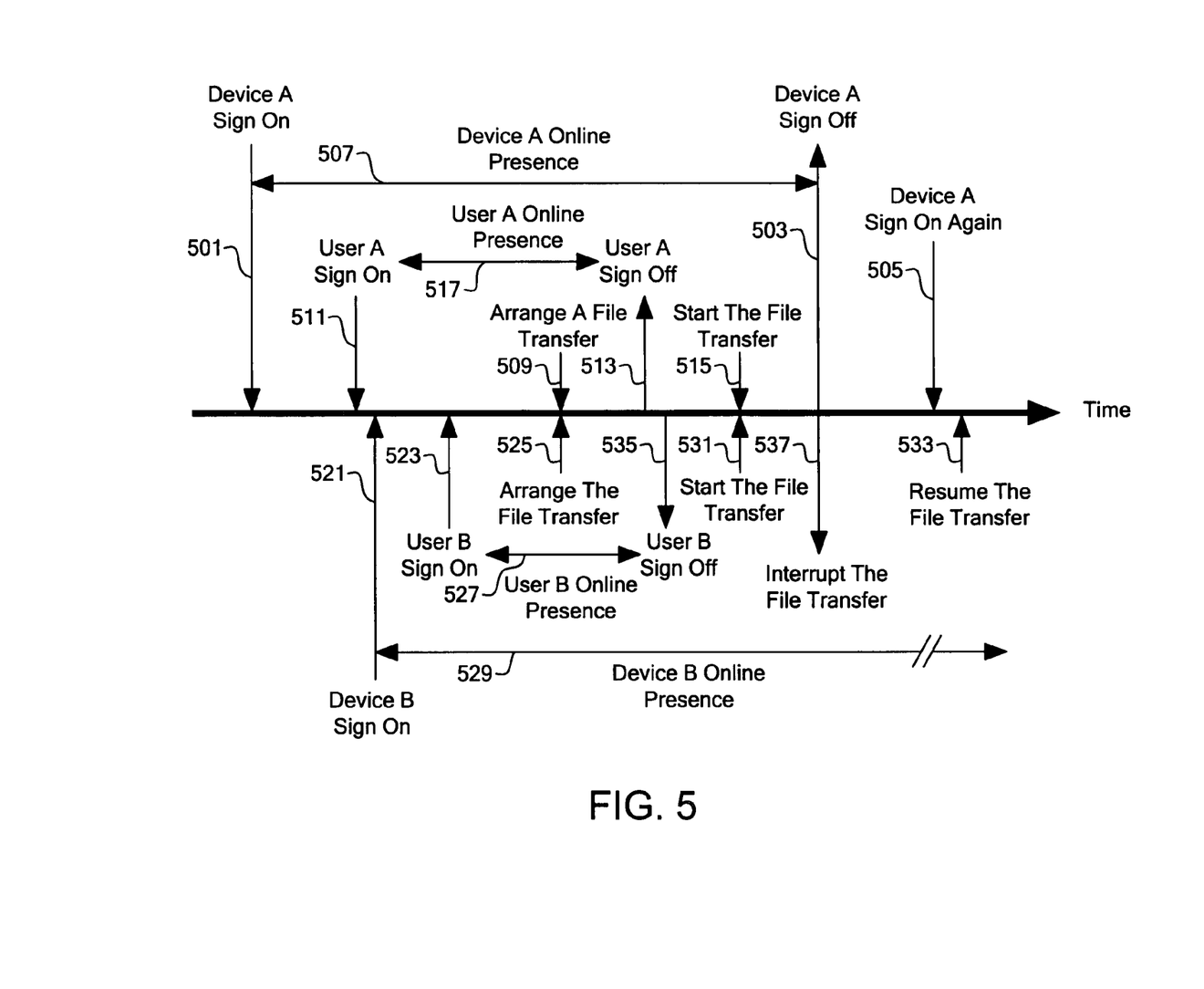
FIG. 5 illustrates a scenario of using device identifiers according to one embodiment of the present invention.

FIG. 5 illustrates a scenario of using device identifiers according to one embodiment of the present invention. In FIG. 5, user A at device A transfers a file to user B at device B using an instant messaging system according to one embodiment of the present invention.

In FIG. 5, the period (507) of device A online presence extends from the instant when device A signs on to the network (501) to the instant when device A signs off the network (503). User A can sign on to the network (511) after, or at the same time with, the device A signs on to the network (501).

When device A is online but user A is not online, other devices can connect to device A to perform communication operations previously arranged by user A without further user interaction from user A. When user A is online, other users may connect to user A for real-time two-way communication. When user A is online, device A is online.

Similarly, user B and device B can sign on to the network (523 and 521) at the same time or at different times.

When both user A and user B are online, user A and user B can arrange (509 and 525) a file transfer in an instant messaging session. The file transfer may be arranged for a future time. For example, the transferring of a video file or a large image file can be time consuming. Thus, the transferring of the file can be scheduled manually by the user or automatically according to network traffic conditions.

The transferring of the video file is scheduled with device A and device B according to their device identifiers. For example, device B may be instructed to send the file to device A; and device A may be instructed to receive the file from device B.

After user A and user B sign off the network (513, 535), the scheduled file transfer starts (515, 531). When device A signs off the network (503), the file transfer is interrupted (537). For example, device A may sign off in response to a user request to sign the device off the network; or, device A may sign off for a restart; or, device A may become offline due to a system crash. After device A signs (505) on again to the network, device A and device B can automatically resume the file transfer (533) without user interaction, since the file transfer is scheduled with device A and device B.

In one embodiment of the present invention, the device identifier is independent from the network parameters used for network communication. Thus, when the network parameters change, the corresponding devices can still connect to each other correctly.

Note that the transferring of the file may start before one of user A and user B signs off. The transferring of the file may be initiated while the user A and user B are exchanging instant messages.

In FIG. 5, the device online presences (507 and 509) are extended beyond the user online presences (517 and 527).

In one embodiment, a device signs onto the network according to user instructions. For example, the user presents credentials to sign the device onto the network without signing on the user onto the network. When the user is online, the device is implicitly signed on.

Alternatively, a program can automatically sign on the device to the network when the network connection is available and when there is a pending communication task or resource sharing. The program stores the user credentials to sign the device onto the network or a proxy of the user credentials to sign the device onto the network. The program can be in an operating system module, or a running service program, or a user application program.

Figure 6:
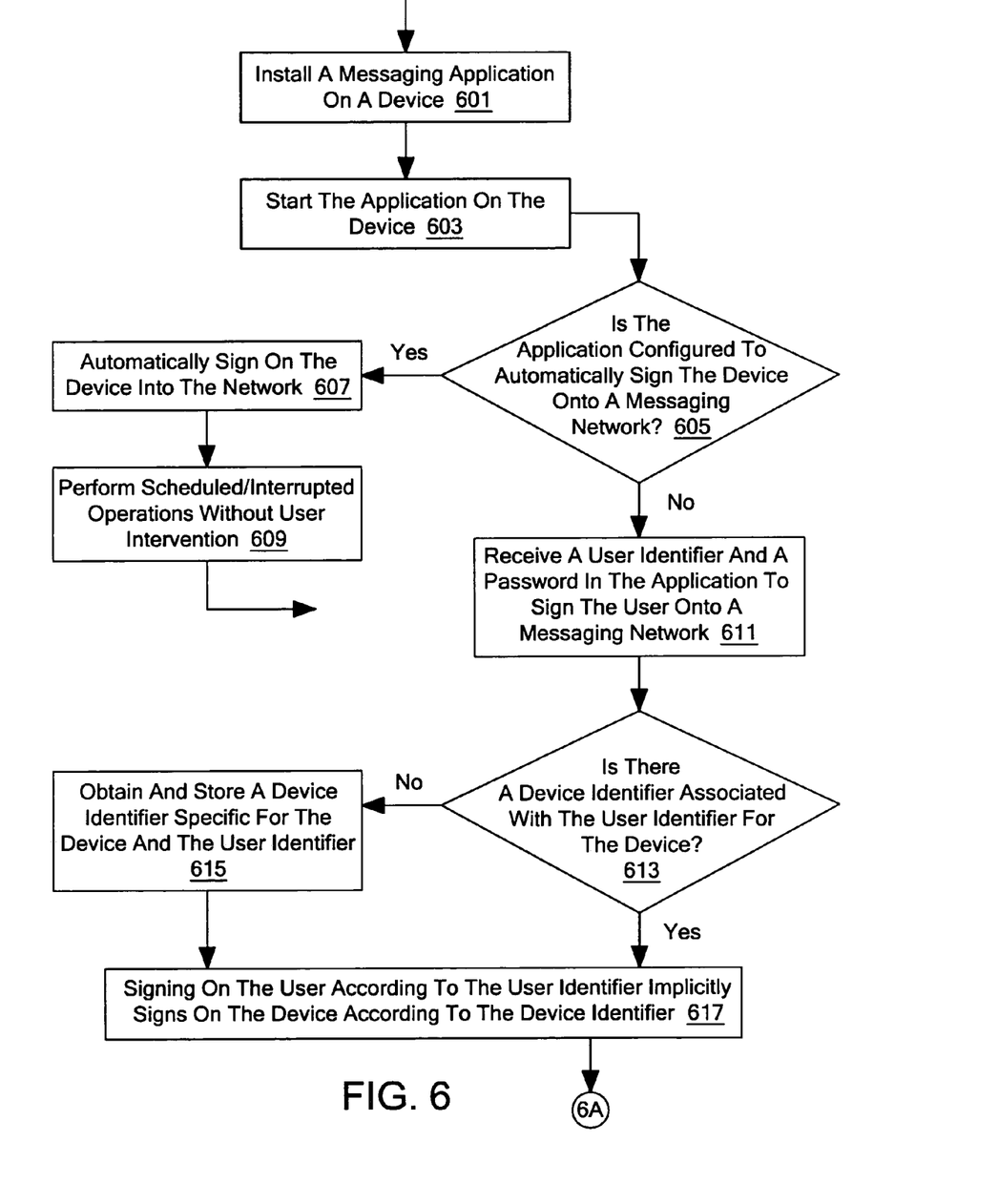
FIG. 6 illustrates a flow chart example according to one embodiment of the present invention.
Figure 6A:
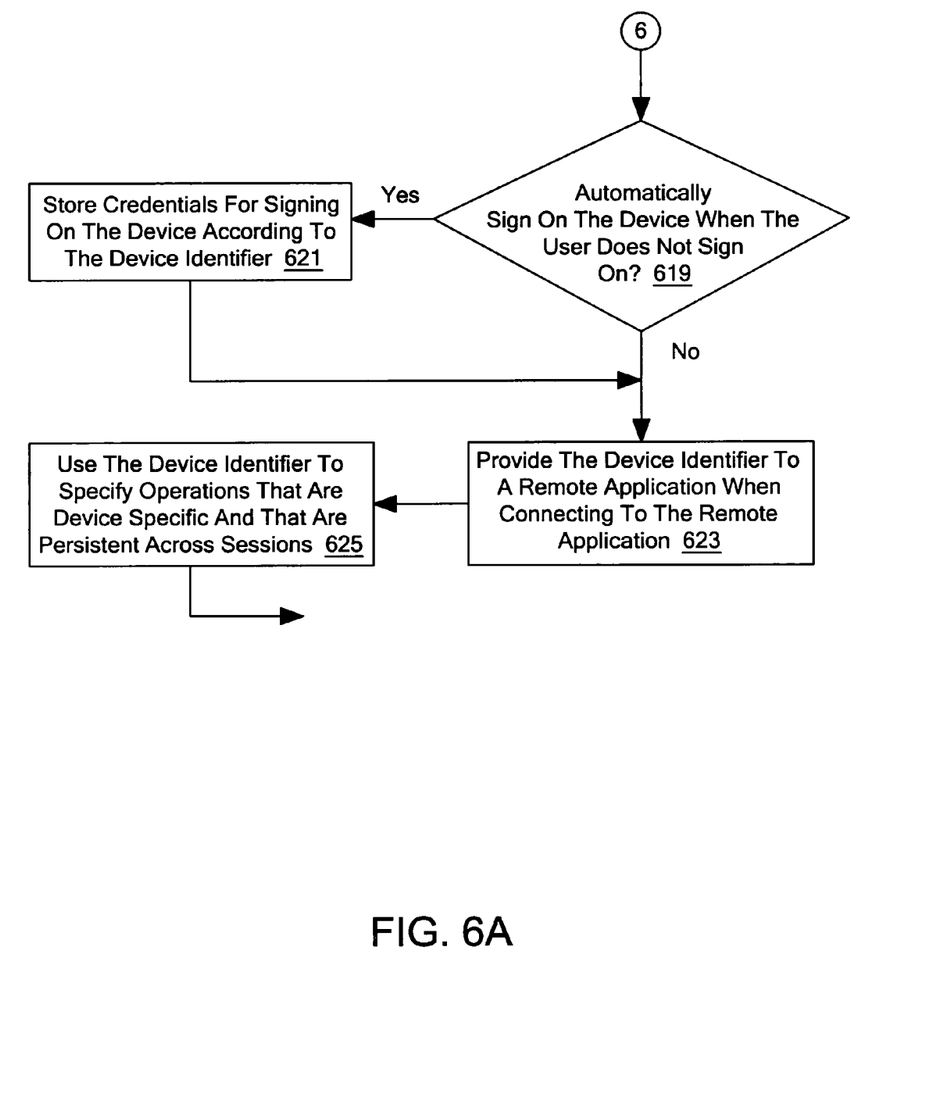

FIG. 6 illustrates a flow chart example according to one embodiment of the present invention.

In FIG. 6, a messaging application is installed (601) on a device, such as a personal computer, a PDA, or a cellular phone. The messaging application provides a user interface for instant messaging in an instant messaging network. An instant messaging network includes a network of devices that are capable to connect to each other for instant messaging, with or without a central server to provide presence service.

When the application is started (603) on the device, it is determined (605) whether or not the application is configured to automatically sign the device onto the messaging network.

If the application is not configured to automatically sign the device onto the messaging network, a user identifier and a password can be received (611) in the application to sign the user onto the messaging network.

For the received user identifier, it is determined (613) whether or not there is a device identifier associated with the user identifier for the device.

If there is no device identifier associated with the user identifier for this device, a device identifier specific for the device and the user identifier is obtained and stored (615).

In one embodiment, a centralized server generates a device identifier that is unique for both the device and the user identifier. For example, the centralize server can keep a record of the number of different devices the user previously used to sign onto the network and use the record to generate a device identifier that includes the user identifier.

Alternatively, the device may generate the device identifier without the help of a centralized server. For example, the device can use a globally/universally unique identifier algorithm to generate a device identifier using the user identifier, the current date and time and other information such that there is reasonable confidence that the device identifier is unique for both the device and the user identifier.

Signing on the user according to the user identifier implicitly signs (617) on the device according to the device identifier. Thus, other messaging applications in the instant messaging network can determine the particular device the user is using according to the device identifier.

It is determined (619) whether or not to configure the application to automatically sign on the device when the user does not sign on.

To automatically sign the device on, credentials for signing on the device according to the device identifier is stored (621). The credentials can be the password for the user identifier. Alternatively, a proxy data based on the user identifier credentials can be generated when the user signs onto the network; and the proxy data is used as credentials for authenticating the device identifier subsequently.

The device identifier is provided (623) to a remote application when connecting to the remote application. The device identifier is used (625) to specify operations that are device specific and that are persistent across sessions.

For example, the device identifier can be used to specify scheduled operations or operations that will resume after interruption. For example, a file may be transferred to the particular device on which the user initiated the operation, not to another device that the user is using after the interruption. The user may switch to a different device after an interruption. It may not be appropriate to resume the file transfer operation on a different device.

After the application is restarted, the device is automatically signed (607) onto the network if the application is configured to automatically sign the device onto a messaging network. Scheduled/interrupted operations can be performed (609) without user intervention.

Alternatively, the user may manually sign the device onto the network without signing on the user identifier onto the network. Thus, the user is absent from the instant messaging network, but the device is on the network to complete previously arranged operations or provide shared resources to authorized remote users.

Figure 7:
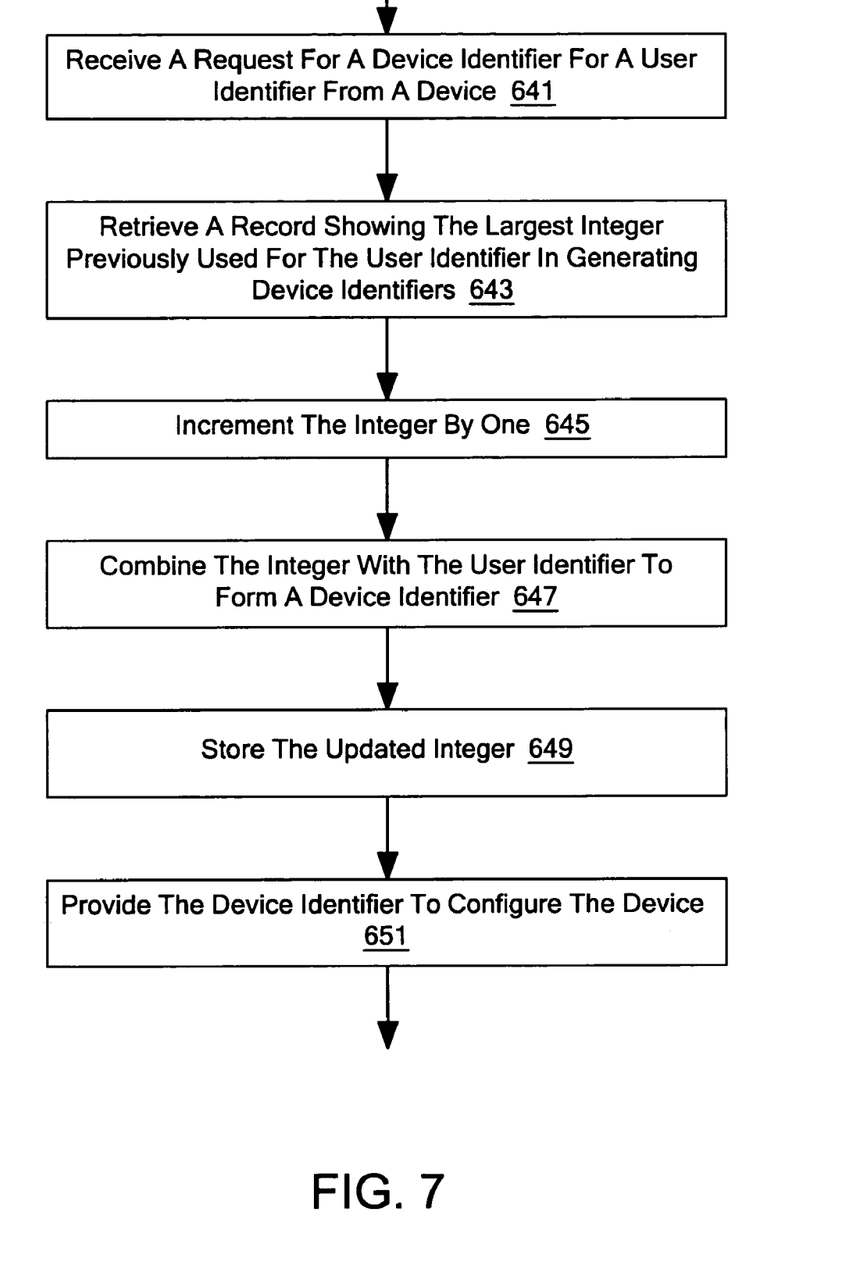
FIG. 7 illustrates an example of generating a device identifier according to one embodiment of the present invention.

FIG. 7 illustrates an example of generating a device identifier according to one embodiment of the present invention.

In FIG. 7, after a request for a device identifier for a user identifier is received (641) from a device, a record showing the largest integer previously used for the user identifier in generating device identifiers is retrieved (643).

The integer can be stored in a database on a server, such as a server for providing user presence service, or a different server.

The integer is incremented (645) by one. The integer is combined (647) with the user identifier to form a device identifier. The updated integer is stored (649). The device identifier is provided (651) to configure the device.

Alternatively, a time stamp can be used in the place of the integer. Alternatively, a random number generated from the time stamp can be used.

Figure 8:
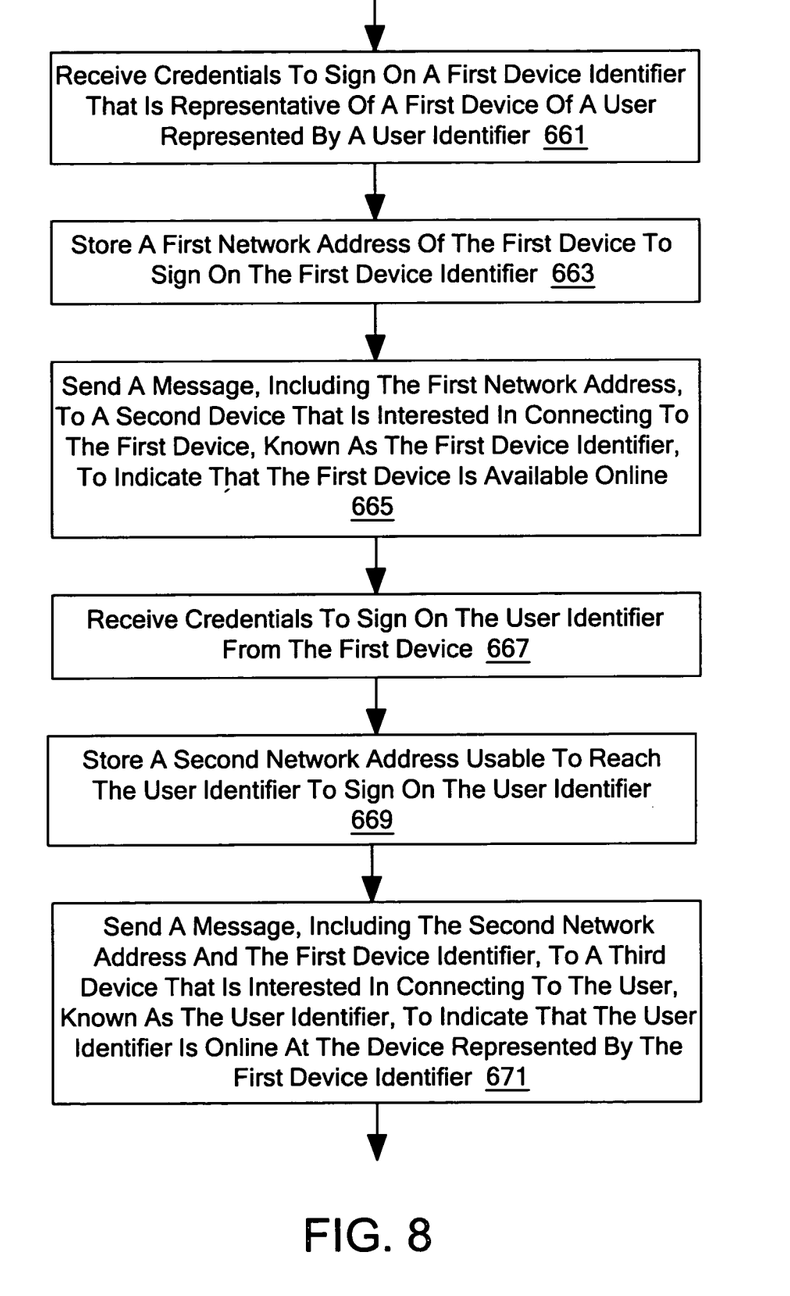
FIG. 8 illustrates an example of signing on users and machines according to one embodiment of the present invention.

FIG. 8 illustrates an example of signing on users and devices according to one embodiment of the present invention.

In FIG. 8, after credentials are received to sign on a first device identifier that is representative of a first device of a user represented by a user identifier, a first network address of the first device is stored (663) to sign on the first device identifier. A message, including the first network address, is sent (665) to a second device that is interested in connecting to the first device, known as the first device identifier, to indicate that the first device is available online.

The message may be sent in response to a request from the second device for presence information about the first device. The message may be sent automatically to devices of users who specify the user identifier in their buddy lists or specify the user identifier as a friend in response to the device signing onto the network or in response to the devices of the users signing onto the network.

With the device presence information, operations that do not require user intervention can be performed without the user signing onto the network.

In FIG. 8, credentials to sign on the user identifier from the first device is received (667) after the device signs onto the network. A second network address usable to reach the user identifier is stored (669) to sign on the user identifier. The second network address may be the same as the first network address. A message, including the second network address and the first device identifier, is sent (671) to a third device that is interested in connecting to the user, known as the user identifier, to indicate that the user identifier is online at the device represented by the first device identifier.

Hardware

Figure 9:
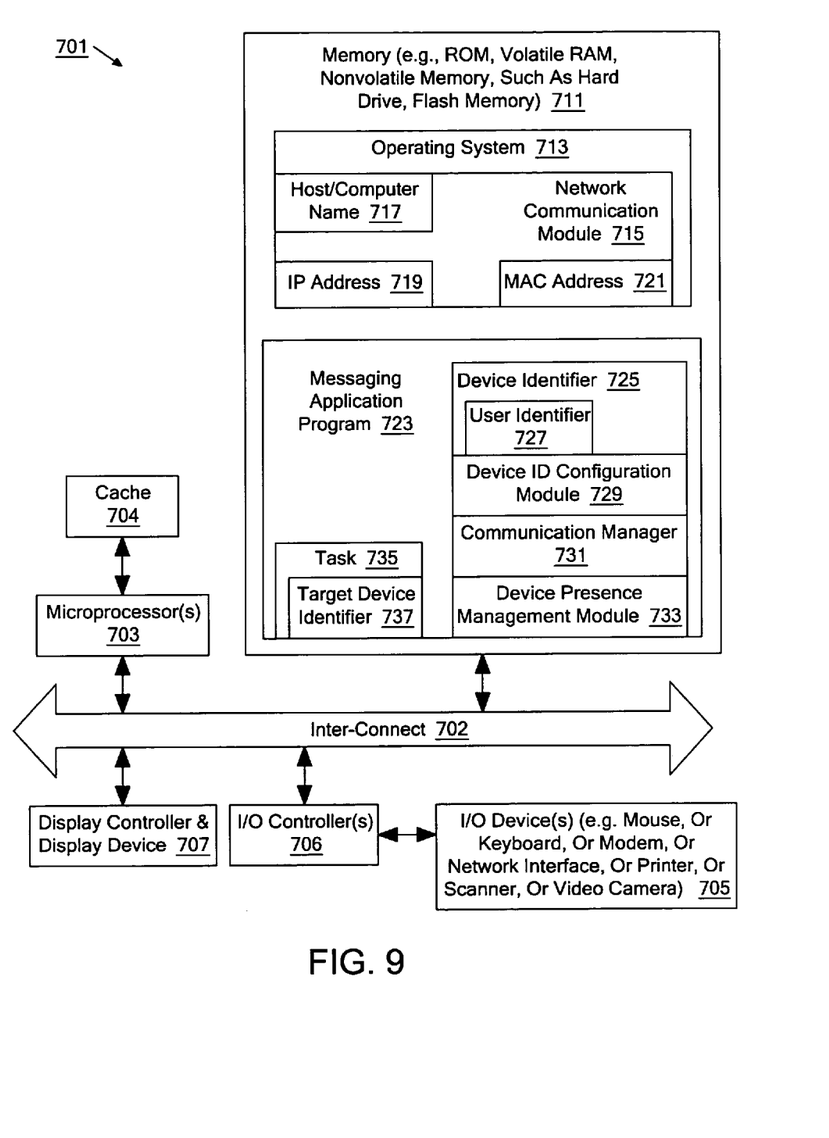
FIG. 9 illustrates a communication device of a messaging network according to one embodiment of the present invention.

FIG. 9 illustrates a communication device of a messaging network according to one embodiment of the present invention. While FIG. 9 illustrates various components of a computer system, it is not intended to represent any particular architecture or manner of interconnecting the components. Other systems that have fewer or more components may also be used with the present invention. For example, a system in the form of PDA or cellular phone may be used with embodiments of the present invention.

In FIG. 9, the communication device (701) is a form of a data processing system. The device (701) includes an inter-connect (702) (e.g., bus and system core logic), which interconnects a microprocessor(s) (703) and memory (711). The microprocessor (703) is coupled to cache memory (704) in the example of FIG. 9.

The inter-connect (702) interconnects the microprocess(s) (702) and the memory (711) together and also interconnects them to a display controller and display device (707) and to peripheral devices such as input/output (I/O) devices (705) through an input/output controller(s) (706). Typical I/O devices include mice, keyboards, modems, network interfaces, printers, scanners, video cameras and other devices which are well known in the art.

The inter-connect (702) may include one or more buses connected to one another through various bridges, controllers and/or adapters. In one embodiment the I/O controller 109 includes a USB (Universal Serial Bus) adapter for controlling USB peripherals, and/or an IEEE-1394 bus adapter for controlling IEEE-1394 peripherals.

The memory (711) may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

The memory (711) stores an operating system (713), which includes a network communication module (715). The network communication module (715) is typically configured with a host/computer name (717) and an IP address (719). The network communication module (715) may also store a MAC address (721) of a network interface device of the device (701).

The networking parameters, such as the host/computer name, IP address and MAC address are typically not suitable for use as device identifiers for device presence awareness.

Some computers on the Internet are configured with duplicated computer names; and changing the host/computer name to configure the network capability does not change the identity of the device in the instant messaging network.

Some devices use dynamic IP addresses, which do not persist over time; and some devices are behind a firewall in a private network. Devices in different private networks may have same IP addresses.

When removable network interface cards are used, the MAC address may be different from time to time. Further, a device may use one of many network interfaces to access the Internet, such as one for wireless connection and one for wired connection. Different network interfaces have different MAC addresses.

In one embodiment, a device identifier (725) is stored for the messaging application program (723) to represent the device (701) for user identifier (727). In one embodiment, the device identifier (725) includes the user identifier (727).

The messaging application (723) includes a device id configuration module (729), a communication manager (731) and a device presence management module (733). In one embodiment, different user identifiers have different device identifiers on the device (701).

The device id configuration module (729) configures a device identifier for a user identifier used in the messaging application program (723) running in the device (701).

The communication manager (731) manages instant messaging between the messaging application program (723) and a remote device using the network communication module (715).

Device presence management module (733) signs the device identifier (725) onto the network and detects the device presence of other devices.

For example, when a communication task (735) is specified with a target device identifier (737), the device presence management module (733) uses the target device identifier (737) to determine the presence of the target device that has the target device identifier (737). When the target device is offline, the task (735) is interrupted. When the target device is online, the task (735) can be resumed.

Figure 10:
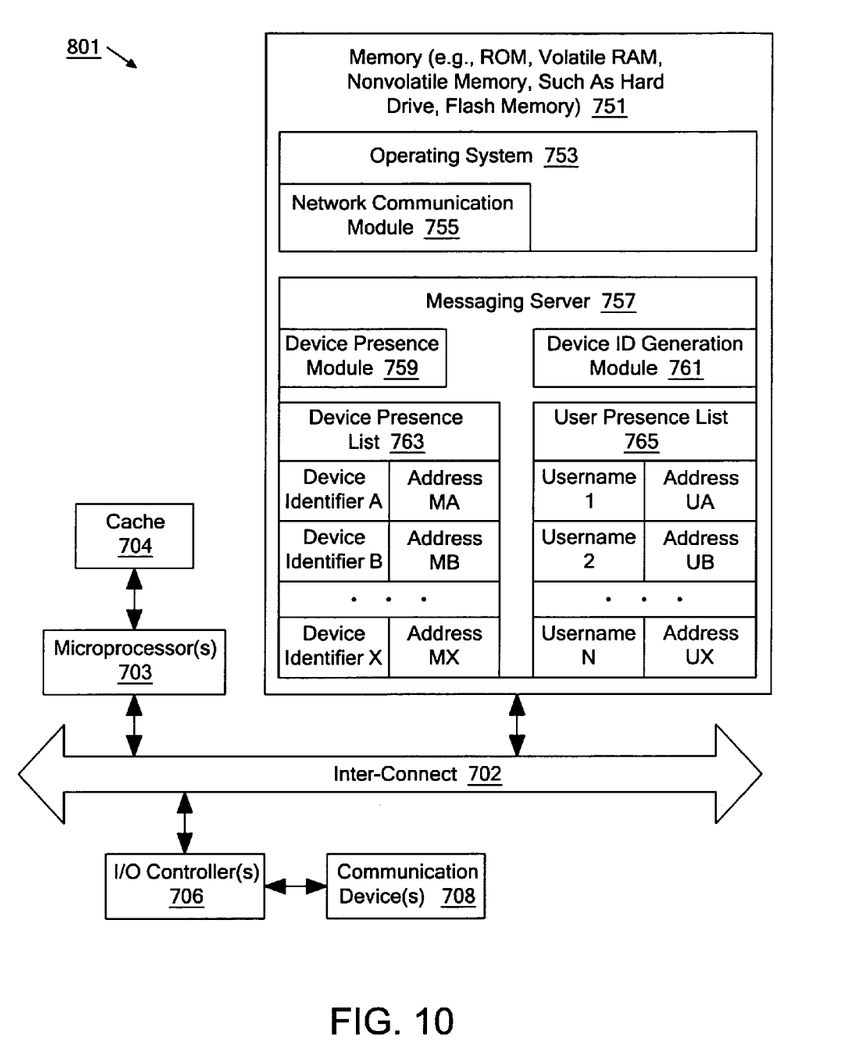
FIG. 10 illustrates a messaging server to provide device presence service according to one embodiment of the present invention.

FIG. 10 illustrates a messaging server to provide device presence service according to one embodiment of the present invention.

While FIG. 10 illustrates various components of a computer system, it is not intended to represent any particular architecture or manner of interconnecting the components. Other systems that have fewer or more components may also be used with the present invention. Some components described above for FIG. 9 can also be used in FIG. 10.

In FIG. 10, the server (801) is a form of a data processing system. The server (701) includes an inter-connect (702), a microprocessor(s) (703), cache memory (704), 110 controller (706), and memory (751). The server (701) includes a communication device(s) (708), such as network interface devices, for serving messaging application programs running on different devices on the network.

The memory (751) stores an operating system (753), which includes a network communication module (755) to control the operation of the communication device(s) (705).

The memory (751) stores a messaging server (757), which includes a device presence module (759) and device id generation module (761).

In one embodiment, the messaging server (757) running on the server (801) generates the device identifiers for connected communication devices. Alternatively, the communication devices generate their own device identifiers; and the messaging server (757) does not include a device id generation module (761).

In one embodiment, the messaging server (757) running on the server (801) maintains a device presence list (763), which shows the network presence of device identifiers. In one embodiment, the messaging server (757) keeps track of the device identifiers that are available online and no list of device identifiers that are offline.

In one embodiment, the messaging server (765) also maintains a user presence list (765). Alternatively, the user presence list may be maintained on a separate server, such as a traditional server of an instant messaging system.

General

The present invention is illustrated by way of example and not limitation in the figures of the accompanying drawings in which like references indicate similar elements.

Although some examples of the present invention are illustrated in the context of an instant messaging system. However, device presence according to embodiments of the present invention can also be used with other types of networks. For example, communication networks in which users can be connected to each other according to user identifiers, regardless of the communication devices used, can have device presences implemented to allow the identification of devices and resources associated with users. For example, a peer-to-peer file-sharing network may use the persistent device presences that are associated with user identifiers to allow the continuation of interrupted file transferring operations. In general, applications of methods and apparatuses according to embodiments of the present invention are neither limited to instant messaging nor to real-time communication.

The description and drawings are illustrative of the invention and are not to be construed as limiting the invention. Numerous specific details are described to provide a thorough understanding of the present invention. However, in certain instances, well known or conventional details are not described in order to avoid obscuring the description of the present invention. References to one or an embodiment in the present disclosure are not necessarily references to the same embodiment; and, such references mean at least one.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the present invention. Thus, the techniques are not limited to any specific combination of hardware circuitry and software nor to any particular source for the instructions executed by the data processing system.

In addition, throughout this description, various functions and operations are described as being performed by or caused by software code to simplify description. However, those skilled in the art will recognize what is meant by such expressions is that the functions result from execution of the code by a processor, such as a microprocessor.

A machine readable medium can be used to store software and data which when executed by a data processing system causes the system to perform various methods of the present invention. This executable software and data may be stored in various places including for example ROM, volatile RAM, non-volatile memory and/or cache. Portions of this software and/or data may be stored in any one of these storage devices.

Thus, a machine readable medium includes any mechanism that provides (i.e., stores and/or transmits) information in a form accessible by a machine (e.g., a computer, network device, personal digital assistant, manufacturing tool, any device with a set of one or more processors, etc.).

For example, a machine readable medium includes recordable/non-recordable media, such as read only memory (ROM), random access memory (RAM), magnetic disk storage media, optical storage media, flash memory devices, etc., as well as electrical, optical, acoustical or other forms of propagated signals, such as carrier waves, infrared signals, digital signals, etc.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The present invention includes methods and apparatuses which perform these methods, including data processing systems which perform these methods, and computer readable media which when executed on data processing systems cause the systems to perform these methods.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A non-transitory machine readable storage medium storing instructions which when executed by a data processing system causes the system to perform a method, comprising:
    assigning a first device identifier to a first communication device of a network, the first device identifier corresponding to a particular user using the first communication device in the network, wherein the first device identifier comprises a unique user identifier to identify the particular user using the first communication device and a first unique data item to uniquely identify the first communication device;
    signing the first communication device onto the network using the first device identifier without signing the particular user onto the network, wherein the first device identifier allows the presence of the first communication device to be detected on the network regardless of whether or not the particular user signs onto the network using the unique user identifier; and
    signing the particular user onto the network using the unique user identifier, wherein the first device identifier allows the particular user to sign off of the network while maintaining device presence so that a task involving the first communication device can be performed while the particular user is not online.

2. The medium of claim 1, wherein the network comprises one from a group consisting: an instant messaging network, a communication network, a real-time communication network, a connected network, and a network with log in authentication.

3. The medium of claim 2, wherein the first device identifier is independent from network communication parameters wherein the first communication device is capable of communicating with devices of the instant messaging network according to the unique user identifier without the first device identifier and wherein the communication device generates the device identifier.

4. The medium of claim 2, wherein the method further comprises:
    generating the first device identifier for the particular user at a server;
    wherein the first device identifier is sent from the server to the first communication device through a network connection.

5. The medium of claim 2, wherein the method further comprises:
    providing credentials to sign the first device identifier onto the instant messaging network without signing the unique user identifier onto the instant messaging network.

6. The medium of claim 2, wherein the method further comprises:
    identifying the first communication device using the first device identifier in communication in the instant messaging network.

7. The medium of claim 1, wherein the method further comprises:
    receiving a device identifier of a remote device of the network, the device identifier of the remote device to represent the remote device for a different user identifier of the network; and
    detecting whether or not the device identifier representative of the remote device is available for a communication connection on a network for the network.

8. The medium of claim 7, wherein the method further comprises:
    associating the device identifier of the remote device with a task involving the remote device; and
    connecting to the remote device to perform the task responsive to a detection that the remote device is available on the network.

9. The medium of claim 8, wherein the detection resumes the task after interruption.

10. The medium of claim 8, wherein the detection is responsive to a schedule for the task.

11. The medium of claim 8, wherein said detecting comprises:
    submitting the different user identifier to a server; and
    receiving a notification from the server when the device identifier representative of the remote device for the different identifier is available on the network.

12. The medium of claim 11, wherein the notification comprises one or more communication parameters usable to make communication connections with the remote device.

13. The medium of claim 1, further comprising:
    tracking a list of device identifiers representative of communication devices that are online in the network;
    wherein one or more of the communication devices are capable of being online in the network without their respective user identifiers being online.

14. A method, comprising:
    assigning a first device identifier to a first communication device of a network, the first device identifier corresponding to a particular user in the network, wherein the first device identifier comprises a unique user identifier to identify the particular user using the first communication device and a first unique data item to uniquely identify the first communication device;
    signing the first communication device onto the network using the first device identifier without signing the particular user onto the network, wherein the first device identifier allows the presence of the first communication device to be detected on the network regardless of whether or not the particular user signs onto the network using the unique user identifier; and signing the particular user onto the network using the unique user identifier, wherein the first device identifier allows the particular user to sign off of the network while maintaining device presence so that a task involving the first communication device can be performed while the particular user is not online.

15. A data processing system, comprising:

means for assigning a first device identifier to a first communication device of a network, the first device identifier corresponding to a particular user using the first communication device in the network, wherein the first device identifier comprises a unique user identifier to identify the particular user using the first communication device and a first unique data item to uniquely identify the first communication device;

means for signing the first communication device onto the network using the first device identifier, wherein the first device identifier allows the presence of the first communication device to be detected on the network regardless of whether or not the particular user signs onto the network using the unique user identifier; and means for signing the particular user onto the network using the unique user identifier, wherein the first device identifier allows the particular user to sign off of the network while maintaining device presence so that a task involving the first communication device can be performed while the particular user is not online.

16. A method, comprising:

assigning a device identifier to a first communication device of an instant messaging network for a user identifier of the instant messaging network, the device identifier to represent the first communication device, the instant messaging network capable of providing communication connections for communication devices according to user identifiers, wherein the device identifier comprises the user identifier and a first unique data item to uniquely identify the first communication device;

signing the device identifier of the first communication device onto the instant messaging network;

signing the user identifier onto the instant messaging network;

sending the device identifier to a second communication device of the instant messaging network to associate the device identifier with a task between the first and second communication devices, wherein the device identifier allows the user identifier to sign off of the network while maintaining device presence so that the task can be performed while the user identifier is not online;

generating device presence information for the device identifier when the device identifier signs onto the network;

detecting whether or not the device identifier representative of the first communication device is available for a communication connection on the instant messaging network based on the device presence information; and resuming the task between the first and second communication devices without user interaction when the first communication device is detected to be available on the instant messaging network after one of the first and second communication devices is offline.

17. The method of claim 14, further comprising:

signing the particular user onto the network using the unique user identifier corresponding to the particular user;

arranging a task between the first communication device and another communication device on the network using the device identifier corresponding to the first communication device;

starting the task; and automatically resuming the task without user interaction when the first communication device is detected to be available after one of the first communication device and the other communication device is offline regardless of whether the particular user is signed on.

18. The medium of claim 1, wherein the method further comprises:

assigning a second device identifier to a second communication device of the network, the second device identifier corresponding to the same particular user, wherein the second device identifier comprises the unique user identifier to identify the same particular user using the second communication device and a second unique data item to uniquely identify the second communication device; and assigning a third device identifier to the first communication device that is different than the first device identifier, wherein the third device identifier comprises a different unique user identifier to identify a different user using the first communication device and a third unique data item to uniquely identify the first communication device.

19. The method of claim 14, further comprising:

assigning a second device identifier to a second communication device of the network, the second device identifier corresponding to the same particular user, wherein the second device identifier comprises the unique user identifier to identify the same particular user using the second communication device and a second unique data item to uniquely identify the second communication device; and assigning a third device identifier to the first communication device that is different than the first device identifier, wherein the third device identifier comprises a different unique user identifier to identify a different user using the first communication device and a third unique data item to uniquely identify the first communication device.

20. The data processing system of claim 15, further comprising:

means for assigning a second device identifier to a second communication device of the network, the second device identifier corresponding to the same particular user, wherein the second device identifier comprises the unique user identifier to identify the same particular user using the second communication device and a second unique data item to uniquely identify the second communication device; and means for assigning a third device identifier to the first communication device that is different than the first device identifier, wherein the third device identifier comprises a different unique user identifier to identify a different user using the first communication device and a third unique data item to uniquely identify the first communication device.

* * * * *